Nov. 17, 1942.   T. B. LEECH   2,302,130
ABSORPTION SYSTEM
Filed Dec. 13, 1939
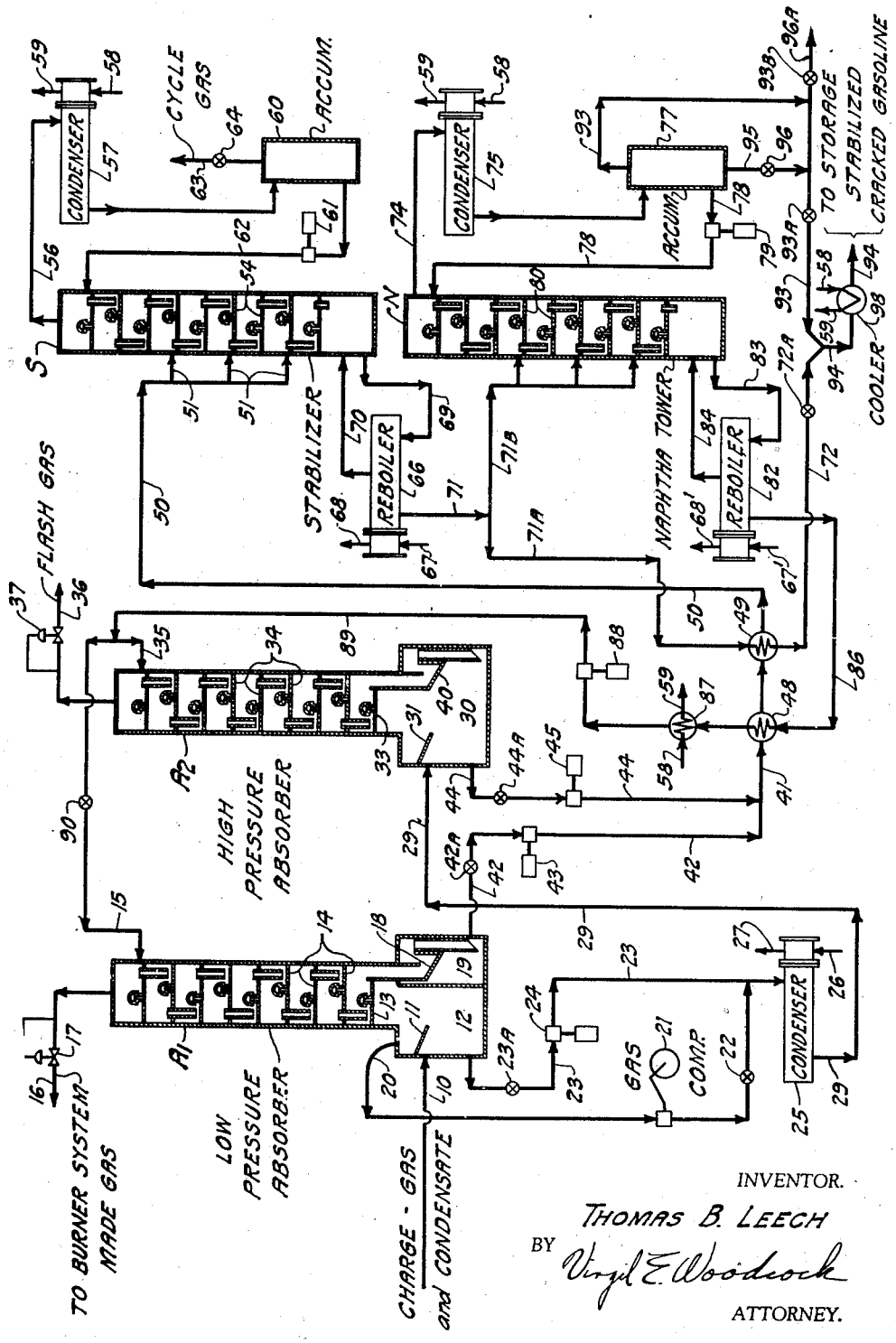
INVENTOR.
THOMAS B. LEECH
BY Virgil E. Woodcock
ATTORNEY.

Patented Nov. 17, 1942

2,302,130

UNITED STATES PATENT OFFICE 2,302,130

ABSORPTION SYSTEM

Thomas B. Leech, Ardmore, Pa., assignor to Petroleum Conversion Corporation, Elizabeth, N. J., a corporation of Delaware Application December 13, 1939, Serial No. 308,896

8 Claims. (Cl. 196—8)

My invention relates to methods of and apparatus for treating incondensible gases from a cracking process, more particularly to the absorption from the gases of those constituents suitable for inclusion in motor fuel, and has for an object the provision of a continuously operable absorption system forming a part of the stabilizing system of a cracking unit and in which stabilizing system products suitable as motor fuel and the absorbed constituents are simultaneously stabilized.

In many of the cracking processes currently in use a substantial amount of gas is formed which must be separated from the final desired product. In that gas there are inescapably present vapors or desirable products which add to or enhance the value of the final product. Heretofore the gas has been burned, sent to storage, or to a separate absorption system where absorption oil served to absorb certain of the desirable constituents which were then distilled from the absorption oil, and the condensate later stabilized. Conversely in the condensate there is present a certain amount of gas which must be later eliminated to reduce the vapor pressure of the final product to that required for usual internal combustion engine operation, which requires stabilization. Such methods of operation leave much to be desired in improved efficiency, less first cost, decreased maintenance and operating costs, and in the elimination of the additional equipment comprising the separate absorption system and its distillation equipment, as well as a separate stabilizer.

It is an object of my invention to provide an absorption system forming a component part of the usual treating or fractionating apparatus and in which a low molecular weight absorption oil is used as the absorption menstruum, and which oil preferably comprises a naphtha fraction obtained after stabilization of the gasoline-like fraction. It is a further object of my invention to eliminate the additional equipment necessary to a separate absorption plant.

In accord with a further object of my invention less heating equipment is needed since the heat requirements of the absorption-stabilization system are materially and significantly less than heretofore required by separate units.

In accord with a further object of my invention a plurality of absorbers are connected in parallel for the purpose of reducing the operating and installation cost of compressing equipment below that which would be required for operation of one absorber at high pressure for complete absorption.

It is yet another object of my invention to decrease the amount of absorption oil required to complete absorption of the desired vapors present in the gases by using low molecular weight absorption menstruum.

In carrying out my invention in one form thereof, the gases, including the vapors which are to be absorbed, and the condensate or final product are introduced into a separating chamber or enlarged zone in which the condensate or liquid is separated from the gases and vapors. In communication with the upper portion thereof, is an absorption tower which receives directly gases and vapors rising from the separating chamber. In the absorber the gases which are to become residue gas are stripped of the desired constituents by countercurrent contact with an absorption oil comprising a naphtha fraction; that is, a fraction boiling within the range of, and constituting the heavier portion of the gasoline. The residual gas leaves the system at this absorber. By parallel connections, both the remaining gas and condensed liquid streams are conducted from the low pressure absorber, respectively elevated in pressure, united, cooled, and are introduced into a second enlarged zone communicating with a second absorber. Similarly the gases rising upwardly into the second absorber are stripped of the desired constituents by an absorption oil comprising a part of the aforesaid naphtha fraction.

All of the liquid products from the cracking system and from the absorbers are then elevated in temperature by any one of several known means, and introduced into a stabilizer, where the light ends are stripped from the gasoline. The resulting condensate or stabilized gasoline is then preferably divided, a part going to storage, and a part to a naphtha tower for reboiling and further fractionation for the separation of the heavier end, as a pentane-free naphtha fraction, which comprises the source of the aforesaid absorption oil. Light condensate from the naphtha tower is condensed and passes to storage either with or separately from the stabilized gasoline.

For a more complete understanding of my invention, reference should now be had to the accompanying drawing which diagrammatically illustrates a typical embodiment of my invention, and in which pipe connections are indicated by single lines.

Referring to the drawing, I have shown my invention in one form as applied to a system in which the charge introduced by way of line 10 comprises by way of example the overhead products from a bubble tower of any of the known forms of cracking systems, though it may comprise gases from any source which include constituents suitable for inclusion in motor fuel. More specifically, the charge introduced through line 10 may preferably comprise the overhead from the bubble tower (not shown) of a system utilizing heat-carrier gas to produce gasoline of high anti-detonating characteristics. Such systems are shown in U. S. Letters Patent #1,842,313, Beardsley et al., and #2,016,297, Sachs, the disclosures of which I incorporate herein by this reference thereto. The overhead products from the bubble tower or rectifier include a relatively large amount of gas and if merely separated from the desired final motor-fuel products the so-separated gas would contain substantial and valuable quantities of those constituents suitable for inclusion in the motor fuel.

In accord with my invention the charging stock, cooled to condensation temperature of the desired final product, is directed against a baffle 11 extending from a wall of an enlarged zone or liquid compartment 12 formed in the lower portion of an absorber $A_1$, although a separate accumulator may be utilized. The baffle 11 serves to change the direction of flow, and under the conditions of reduced pressure in zone 12, facilitates separation of the liquid or condensate from the gas and light vapors, a part of which rises upwardly into the absorber $A_1$, through bubble plate 13, and additional plates 14 of a number adequate to insure substantially complete absorption of the desired constituent of the vapors and gas, and preferably of butane and pentane. For convenience only eight plates or trays 14 are shown, though it will be understood that fifteen or twenty or more will ordinarily be desirable depending on the extent of absorption desired.

The bubble plates are shown as including the ordinary bubble-tower type of trays, bubble caps, and depending liquid legs extending between trays, and this type of construction is preferred, though my invention comprehends any suitable type of apparatus for the countercurrent contacting of rising vapors and gas with an absorption menstruum or oil. The absorption menstruum, comprising a naphtha fraction obtained in a manner more fully described hereinafter, is introduced through line 15 above the uppermost tray and flows downwardly from tray to tray while the rising gases and vapors bubble upwardly through the descending liquid. The intimate contacting of the naphtha fraction with the vapors and gas strips them of those constituents suitable for inclusion in the motor fuel.

By providing the naphtha fraction, having a molecular weight of approximately 125 to 175 and one as close as possible to that of the pentane or butane which it is desired to absorb, but sufficiently high to prevent equilibrium loss, less absorption medium is required for the absorption of a given amount of the butane or pentane.

The stripped gases are discharged from the top of absorber $A_1$ by way of line 16 which includes a pressure control valve 17 of the type which automatically opens when the pressure within absorber $A_1$ exceeds a certain amount, and closes when it falls below that amount, to maintain the pressure constant, for example between 70 to 150 pounds per square inch.

As the descending liquid arrives at the lowermost plate or tray 13 it is directed downwardly over a guiding baffle 18 and into a second enlarged zone or liquid compartment 19, integral with the absorber.

As indicated above, only a part of the gases and vapors rise upwardly through absorber $A_1$. The remaining part is withdrawn from the upper region of zone 12 by way of line 20, elevated in pressure by a gas compressor 21 and under control of valve 22 is introduced into a line 23. From the lower part of the zone or compartment 12, liquid is withdrawn through said line 23, which includes a pump 24 for elevation in pressure of the liquid, after which it mixes with the compressed vapors and gas. The mixture then passes through a condenser 25, supplied with cooling fluid as indicated at 26 and 27, and by line 29 is discharged into an enlarged zone or liquid compartment 30 of a second absorption tower $A_2$. Preferably a baffle 31 is provided to change the direction of flow within the zone 30 to assist in the separation of the gas and lighter products from the liquid.

The absorber $A_2$ is also provided with a lower tray 33 and a plurality of additional trays 34, fifteen to twenty or more depending upon the desired extent of absorption, although only eight trays are shown. The gases and vapors rise upwardly through the trays and are countercurrently contacted with absorption menstruum, the naphtha fraction, introduced above the upper tray through line 35. Gas stripped of constituents suitable for inclusion in the motor fuel product, particularly butane and pentane, is discharged from the high pressure absorber $A_2$ by way of line 36 and under the control of a pressure regulation valve 37 which opens and closes in response to variation in pressure within the absorber $A_2$ and thereby functions to maintain substantially constant the pressure therein. Preferably that pressure ranges from 200 to 400 pounds per square inch, and higher. The pentane-free and vapor-free gas discharged by way of line 36 may be burned, sent to storage, or it may be heated and introduced as flash gas into vaporizing zones utilized earlier in the cracking system to vaporize a part of the charging stock. The latter use is preferred since the gas being at high pressure may be so used without further compression.

The absorption medium comprising the naphtha fraction in absorber $A_2$ flows downwardly from tray to tray and is constantly enriched by the pentane and other desirable heavier constituents. From the bottom tray 33 the liquid flows downwardly over a guiding baffle 40 into the liquid compartment 30. The liquid level in each of the absorption towers $A_1$ and $A_2$ is maintained sufficiently high to act as a seal and prevent the short-circuiting of the gas around the baffle plates 18 and 40, or in other words to insure that it shall pass upwardly and bubble through the liquid on the bottom tray of each tower.

The enriched absorption menstruum from each absorption tower plus the condensate originally entering the system, is joined in line 41 after suitable elevation of pressure. Specifically, the enriched oil or naphtha from compartment 19 passes by way of line 42, is elevated in pressure by pump 43 and thereafter enters line 41. Similarly the enriched naphtha in mixture with the liquid products introduced into tower A₂ passes by way of line 44, is elevated in pressure by pump 45, enters line 41, and in mixture with the stream from line 42 passes through heat exchangers 48 and 49 where the mixture is elevated in temperature. From the exchangers the mixed streams are by line 50 introduced into the stabilizers by one or more of the connections 51.

The stabilizer S, provided with a plurality of trays, bubble caps, and liquid standpipe connections, indicated generically at 54, serves to fractionate the incoming feed for the purpose of removing the light ends or very low boiling fractions, and including some of the very low-boiling material absorbed in towers A₁ and A₂. The overhead passes by way of line 56 through condenser 57, where it is cooled by heat exchange with a cooling medium flowing through lines 58 and 59, and thence into an accumulator 60. The condensate from the accumulator is withdrawn by pump 61 and by line 62 introduced into the stabilizer S as reflux therefor, the reflux passing downwardly from tray to tray in countercurrent contact with the ascending vapors.

Within the accumulator gas is separated from the overhead condensate, as by baffle structure (not shown), and passes therefrom by way of line 63 and under the control of valve 64. This gas which may comprise a substantial percentage of butane and lighter hydrocarbons preferably forms a part of the supply of the heat-carrier gas, which when superheated to above 1200° F. produces cracking and polymerization of the butane and other constituents to produce useful amounts of heavier hydrocarbons suitable for inclusion in motor fuel.

It will be observed the charge from line 50 entered the intermediate portion of the stabilizer. To supply heat to the stabilizer for the stripping of light undesirable gaseous constituents from the ultimate gasoline and supply heat to enable reflux to be used for fractionation of low boiling constituents of the feed, a reboiler 66 supplied with a heating medium through lines 67 and 68 is provided. Liquid is withdrawn from the bottom of the stabilizer by way of line 69, and discharged into the reboiler, where it flows in indirect heat exchange with the heating medium. The lighter portions of the liquid are vaporized and pass by way of line 70 into the lower portion of the stabilizer, and upwardly in countercurrent contact with the descending liquid. The enriched absorber oil is partly stripped therein and stabilized concurrently with the condensate.

The liquid component from the reboiler 66 is removed through line 71 and divided into two streams, one passing by way of line 71A through the heat exchanger 49 where it gives up heat to the material in line 41 and thence through line 72 through a cooler and to storage; and the other stream passes by way of line 71B through any one of several inlets into a naphtha tower or fractionator N. The vapors leaving the top of the tower N pass by way of line 74 through a condenser where they are cooled and condensed by heat interchange with a cooling medium circulated therethrough by way of lines 58 and 59. The condensate flows into an accumulator 77, a part being withdrawn through line 78, elevated in pressure by pump 79 and returned to the naphtha tower above the upper tray as reflux therefor. The reflux as it descends from tray to tray, generally designated at 80, and comprising fifteen or twenty or more, countercurrently contacts with the ascending vapors.

To provide heat to insure stripping of the heavy ends of the feed below the point of admission of the vapors from line 71B, and fractionation of the lighter constituents by sufficient reflux, a reboiler 82 is provided, which receives liquid from the bottom of the tower N by way of line 83. The withdrawn liquid is heated by heat exchange with a heating medium circulated through the reboiler by way of lines 67' and 68'. The lighter portion of the liquid is vaporized and is returned to the lower part of the tower N through the line 84. The heavier portion of the liquid, a pentane-free naphtha fraction, is withdrawn from the reboiler 82 by way of line 86 and, passing through the heat exchangers 48 and cooler 87, is cooled. A cooling medium is circulated through the heat exchanger 87 by means of lines 58 and 59. The naphtha fraction by pump 88 is then elevated in pressure and by line 89 connected to lines 15 and 35 introduced as the absorbing oil or menstruum for the absorbers A₁ and A₂. A valve 90 may be interposed in line 15 to control the quantity of naphtha introduced into the absorber A₁.

The lighter portion of the stabilized gasoline is withdrawn from accumulator 77 by way of line 93, and mixes with the stabilized fraction, line 72, in the common line 94. A valve 72A is included in line 72 to reduce the pressure the required amount. If desired a part of the lighter portion of gasoline may be withdrawn from the bottom of the accumulator by way of line 95 and under the control of valve 96. Valves 93A and 93B and line 96A are provided so that the lighter gasoline or naphtha fraction may be withdrawn and sent to storage instead of introduced into the stabilized gasoline in line 72.

The final product, line 94, passes through a cooler 98 through which there circulates a cooling medium by way of lines 58 and 59. By first mixing the two streams of slightly different physical characteristics before they are cooled, and then cooling the mixture the equilibrium conditions are most favorable and tend to eliminate any stratification during subsequent storage. The mixture of the two streams, lines 72 and 93, while at elevated temperature and possibly while one or both streams is or are partly in vapor phase insures such thorough commingling of the streams that subsequent tendency toward stratification is substantially entirely eliminated.

The methods and apparatus described provide greater yield of the desired product, motor fuel, and especially gasoline, when producing a product of a given octane value or anti-knock characteristic, and procure a greater yield of a desired product for a system of a given size. In accord with my invention losses due to inclusion in the gas discharged from the system of products suitable for the final product are substantially eliminated without the usual additional and rather complex equipment utilized in connection with absorption systems.

By way of further specific example, the particular charging stock introduced by way of line 10, cracked products from a cracking system utilizing heat-carrier gas for producing the cracking reaction, may comprise the heat-carrier gas and the desired products suitable for motor fuel of high anti-knock characteristics.

In the absorber A₁, operating at a pressure of from 70 to 150 pounds per square inch gage, and a temperature at the top thereof of from 90 to 120° F., all constituents such as pentane and heavier constituents are stripped from the gas rising upwardly through the assembly of trays 14. The gas from the overhead line 16 comprises the made or "make" gas of the system and is suitable for use as fuel under the pipe stills or heaters utilized in the cracking end of the system. That gas may comprise by way of example, hydrogen and the gaseous $C_1$, $C_2$ and $C_3$ hydrocarbon compounds.

The larger part of the gas is withdrawn by way of line 20, compressed by compressor 21 and introduced into the high pressure absorber $A_2$. In absorber $A_2$, the temperatures and pressures and the naphtha fraction comprising the absorption menstrum are all selected for maximum absorption of the most desired products from the gases, in this typical example, of the pentanes and heavier constituents. Thus the temperature at the top of absorber $A_2$ may be within the range of from 90 to 120° F., and its pressure between 200 and 600 pounds gage. Moreover, because the naphtha fraction has physical characteristics, particularly a boiling point and molecular weight near that of the pentane and pentane-like products, the volume or weight of the absorbing naphtha for absorption of a given percentage of pentane present may be and is less than if a material of substantially higher molecular weight than naphtha were used, such as gas oil or mineral seal oil. Also in the high pressure absorber $A_2$ considerably less absorption oil need be circulated per thousand feet of gas than in absorber $A_1$ for the same absorption of pentane. When absorbing for all the $C_5$ compounds and those heavier, a substantial percentage of the $C_4$ compounds are also absorbed but these may be eliminated, as more fully explained hereinafter.

As an example of quantities, 550 barrels per 24-hour day of absorption oil may be circulated through the absorber $A_2$ for 1,280,000 cubic feet of gas per 24-hour day. Considerably more, as twice as much absorber oil is circulated through the low pressure absorber. The amount of absorption oil which may be used is not dependent upon the amount of naphtha made per unit of time by the cracking end of the system since the naphtha is circulated between the absorber and the fractionators S and N, and in this cycle there may be built up any required amount of absorption oil, without imposing a further heat load on the bubble tower (not shown).

As already shown, the absorption naphtha and the absorbed desired constituents, including pentane and some lighter and heavier materials, flow downwardly through the absorbers $A_1$ and $A_2$. The enriched menstruums are introduced directly into the stabilizer S, together with the gasoline condensate.

Thus before reaching the stabilizer a large percentage of the $C_1$ and $C_2$ hydrocarbons are withdrawn from the absorbers $A_1$ and $A_2$. These lighter gases are particularly suitable for reduction of the partial pressure conditions within the flash drum or drums from which is or are derived the vapor streams to be cracked; and more suitable and desirable than if the flash gas contained a large percentage of the heavier $C_3$ and $C_4$ compounds.

Within the stabilizer S, the added heat, reboiler 66, and the fractionation serves to separate from the gasoline or motor fuel, the $C_3$ and $C_4$ compounds and all of the lighter compounds, which due to equilibrium conditions carry over in relatively small quantity from the absorbers. The result is that the gases withdrawn from the accumulator 60 have a relatively high concentration of the $C_3$, $C_4$ compounds; and is materially heavier than the gaseous mixture discharged from the absorbers as flash gas or make gas. Since the gases withdrawn from the stabilizer, accumulator 60, form the supply for the cycle gas and are heated to around 1200° F., advantageous polymerizing reactions are secured which increase the yield of gasoline or motor fuel, and which materially increase the production of motor fuel constituents of exceedingly high antiknock value. In other words, I have found that a higher yield, higher octane numbers, and materially better road performance in terms of antiknock value, are secured when the cycle gas is fairly rich in $C_3$ and $C_4$ compounds and relatively lean in the lighter $C_1$ and $C_2$ compounds.

The stabilized gasoline withdrawn from stabilizer S by way of the reboiler 66 and line 71 is divided into two streams, one stream, lines 71A, 72, going to storage as stabilized gasoline and the other stream, line 71B, to the naphtha tower or fractionator N. In the stabilizer S, the $C_4$ compounds and lighter are to substantial extent removed, the top temperature thereof being from 130 to 160° F. with a pressure of 250 pounds gage, and a bottom temperature of 350° F. In the naphtha tower N all of the constituents remaining which might be absorbed from the gases in the absorber are removed, that is removed to as large a degree as practical. Those materials comprise nearly all the $C_5$ compounds, those of less than 5 carbon molecules, such as the $C_3$ and $C_4$ compounds, and possibly a small percentage of the heavier compounds, or those above or heavier than the $C_5$ compounds.

It will be understood that the conditions of operation may be varied from this specific example, and that in wintertime, when the vapor pressure may be higher than in summertime, some of the $C_4$ compounds may be retained in the stabilized gasoline. The percentage of $C_4$ compounds removed by the stabilizer may be adjusted to produce a gasoline having the required vapor pressure.

However, the stream withdrawn by line 86 from the reboiler 82, which supplies heat to the fractionator N, always is an exceedingly lean absorbing menstruum, which, after material cooling, is highly effective in absorbing the desired constituents from the gases in the absorbers $A_1$ and $A_2$. The top temperature of the tower N is preferably between about 220 and 250° F., with a bottom temperature between about 300 and 350° F., and a pressure of approximately 35 pounds gage.

The overhead from the naphtha tower or fractionator N is condensed in condenser 75, supplied with cooling water by lines 58 and 59, and from accumulator 77 passages to storage through line 93A (valve 93A being closed), or immediately blended into the stabilized stream, line 72 (the valve 93B being closed and the valve 93A open) in amount determined by the permissible vapor pressure of the final stabilized gasoline withdrawn from the system by way of line 94.

As I have said, the foregoing specific illustrations are not to be taken as limitative upon my invention, since it will further be apparent different operating conditions will be most suited to and selected for, different cracking stocks, such as topped crude, gas oil and the like. For example, where the cracked products are high in compounds of low vapor pressure, not only the C₅ compounds but a substantial proportion of the C₄ compounds may be included in the stabilized gasoline withdrawn from the system by way of line 94. Also the absorbers A₁ and A₂ may be operated for maximum absorption of the C₄ compounds instead of the C₅ compounds, as by increasing the quantity of absorbing menstruum, or by further lowering its temperature by means of the cooler 87.

Moreover, in a broader aspect of my invention, only one of the absorbers need be utilized with either all of the gas compressed for high pressure absorption, absorber A₂; or none of the gas compressed for low pressure absorption, absorber A₁; as specific operating and design conditions may dictate.

While I have shown a particular embodiment of my invention, it will be understood that I do not limit myself thereto, since many modifications may be made, and I, therefore, contemplate by the appended claims to cover any such modifications as fall within the spirit and scope of my invention.

What I claim is:

1. The method of recovering from the products from a petroleum cracking operation constituents thereof normally gaseous and suitable as motor fuel, which comprises stabilizing in a stabilizing zone a liquid fraction derived from the cracked products to a vapor pressure suitable as motor fuel, in a separate fractionating zone reboiling and fractionating at least a part of said stabilized liquid fraction to obtain a lean naphtha for absorbing menstruum, in separate absorption zones flowing said menstruum countercurrently to parallel streams of the gaseous and vaporous constituents of said products for absorption in the menstruum of C₃, C₄ and C₅ constituents, conducting the absorption in one of said zones under a materially greater pressure than in another of said zones, supplying a materially greater quantity of absorbing menstruum per unit volume of the gaseous and vaporous constituents to said low pressure absorption zone than to said high pressure absorption zone, from said stabilizing zone removing from the system products lighter than those desired in the motor fuel, and in said fractionating zone separating from said liquid fraction said lean naphtha freed of said C₃, C₄ and C₅ constituents.

2. The method of recovering from the products from a petroleum cracking operation constituents thereof normally gaseous and suitable as motor fuel, which comprises stabilizing in a stabilizing zone a liquid fraction derived from the cracked products to a vapor pressure suitable as motor fuel, in a separate fractionating zone reboiling and fractionating at least a part of said stabilized liquid fraction to obtain a lean naphtha for absorbing menstruum, in high and low pressure absorption zones flowing said menstruum countercurrently to simultaneously derived streams of gaseous and vaporous constituents of said products for absorption therein of C₃, C₄ and C₅ constituents, compressing the gases and vapors of one of said streams before passage to said high pressure zone, controlling the division of said menstruum to provide in the low pressure zone a materially greater quantity of menstruum per unit volume of the gaseous and vaporous constituents than in the high pressure zone, in said stabilizing zone removing from the system products lighter than those desired in the motor fuel, and in said fractionating zone removing from said liquid fraction practically all of the C₄ and C₅ compounds.

3. In a system of recovering products suitable as motor fuel from cracked petroleum which includes incondensible gases and a liquid gasoline fraction, the method which comprises separating in an enlarged zone the petroleum into liquid and gaseous fractions, in an absorption zone directly above and communicating with said enlarged zone countercurrently contacting the gases and vapors with an absorption menstruum to absorb from the incondensible gases vapors within the boiling range of products suitable as component parts of motor fuel, withdrawing said incondensible gases as an overhead product from the absorption zone, withdrawing the separated liquid fraction from said enlarged zone, and separately withdrawing said enriched absorption menstruum from said absorbing zone, commingling the liquid fraction from said enlarged zone with said enriched absorption menstruum, stabilizing the mixture by removing the lighter fractions thereof and preventing their return to the absorption-stabilization cycle, dividing the stabilized products and separating from one division thereof a lean naphtha fraction which forms the source of supply of said absorption menstruum, commingling the other division thereof with the products remaining after separation of said naphtha fraction, and simultaneously cooling said last-mentioned commingled products.

4. In a system of recovering products suitable as motor fuel from petroleum which has been subjected to conversion conditions, the combination of an absorber, baffle structure in the lower portion thereof dividing it into a first and a second liquid compartment, means for introducing into said first compartment a stream of said petroleum, structure above said first compartment for countercurrently contacting rising vapors and gas with an absorbing menstruum, means for introducing the absorbing menstruum into the upper portion of said absorber, means for directing into said second compartment the absorbing menstruum and condensed vapors, a second absorber having a liquid compartment in the lower portion thereof, provided with an inlet and an outlet, means connecting said second absorber to said first absorber comprising a vapor and gas line communicating with the upper portion of said first compartment for receiving gases and vapors before contact with said absorption menstruum in said first-named absorber, and a liquid line communicating with the lower portion of said first compartment for withdrawal of liquid therefrom, means included in each of said last-named lines for elevating the pressures of said vapors and gas and of said liquid before entry into said second absorber, said second absorber having a pressure maintained therein substantially higher than the pressure upon said first absorber, structure within said second absorber for countercurrently contacting rising vapors and gas with an absorbing menstruum, and means for supplying to the upper portion of said second absorber said absorbing menstruum.

5. In a system of recovering products suitable as motor fuel from petroleum which has been subjected to conversion conditions, the combination of an absorber, baffle structure in the lower portion thereof dividing it into a first and a second liquid compartment, means for introducing into said first compartment a stream of said petroleum, structure above said first compartment for countercurrently contacting rising vapors and gas with an absorbing menstruum means for introducing the absorbing menstruum into the upper portion of said absorber, means for directing into said second compartment the absorbing menstruum and condensed vapors, a second absorber having a liquid compartment in the lower portion thereof, provided with an inlet and an outlet, means connecting said second absorber to said first absorber comprising a vapor and gas line communicating with the upper portion of said first compartment for receiving gases and vapors before contact with said absorption menstruum in said first-named absorber, and a liquid line communicating with the lower portion of said first compartment for withdrawal of liquid therefrom, means included in each of said last-named lines for elevating the pressures of said vapors and gas and of said liquid before entry into said second absorber, means for uniting said streams, cooling the mixture, and for conducting it into said second absorber, said second absorber having a pressure maintained therein substantially higher than the pressure upon said first absorber, structure within said second absorber for countercurrently contacting rising vapors and gas with an absorbing menstruum, and means for supplying to the upper portion of said second absorber said absorbing menstruum.

6. In a system of recovering products suitable as motor fuel from petroleum which has been subjected to conversion conditions, the combination of an absorber, baffle structure in the lower portion thereof dividing it into a first and a second liquid compartment, means for introducing into said first compartment a stream of said petroleum, structure above said first compartment for countercurrently contacting rising vapors and gas with an absorbing menstruum, means for introducing the absorbing menstruum into the upper portion of said absorber, means for directing into said second compartment the absorbing menstruum and the absorbed vapors, a second absorber having a liquid compartment in the lower portion thereof, provided with an inlet and an outlet, means connecting said second absorber to said first absorber comprising a vapor and gas line communicating with the upper portion of said first compartment for receiving gases and vapors before contact with said absorption menstruum in said first-named absorber, and a liquid line communicating with the lower portion of said first compartment for withdrawal of liquid therefrom, means included in each of said last-named lines for elevating the pressures of said vapors and gas and of said liquid before entry into said second absorber, means for uniting said streams, cooling the mixture, and for conducting it into said second absorber, said second absorber having a pressure maintained therein substantially higher than the pressure upon said first absorber, structure within said second absorber for countercurrently contacting rising vapors and gas with an absorbing menstruum, means for supplying to the upper portion of said second absorber said absorbing menstruum, means including an outlet from said liquid compartment of said second absorber for withdrawal of a liquid fraction therefrom, and means for separating from the liquid fraction a lean naphtha fraction to form the supply of said absorption mentruum.

7. In a system of recovering products suitable as motor fuel from petroleum which has been subjected to conversion conditions, the combination of an absorber, baffle structure in the lower portion thereof dividing it into a first and a second liquid compartment, means for introducing into said first compartment a stream of said petroleum, structure above said first compartment for countercurrently contacting rising vapors and gas with an absorbing menstruum, means for introducing the absorbing menstruum into the upper portion of said absorber, means for directing into said second compartment the absorbing menstruum and absorbed vapors, a second absorber having a liquid compartment in the lower portion thereof, provided with an inlet and an outlet, means connecting said second absorber to said first absorber comprising a vapor and gas line communicating with the upper portion of said first compartment for receiving gases and vapors before contact with said absorption menstruum in said first-named absorber, and a liquid line communicating with the lower portion of said first compartment for withdrawal of liquid therefrom, means included in each of said last-named lines for elevating the pressures of said vapors and gas and of said liquid before entry into said second absorber through its said inlet, said second absorber having a pressure maintained therein substantially higher than the pressure upon said first absorber, structure within said second absorber for countercurrently contacting rising vapors and gas with an absorbing menstruum, means for supplying to the upper portion of said second absorber said absorbing menstruum, and a stabilizer receiving the liquid from said second absorber for removing the light ends from said liquid, a fractionating tower, means for supplying thereto a part of the stabilized liquid fraction from said stabilizer, and means including said fractionating tower for supplying absorbing menstruum to said absorbers, said menstruum comprising only the heavier portion of the liquid fraction delivered thereto from said stabilizer.

8. In a system of recovering products suitable as motor fuel from petroleum which has been subjected to conversion conditions of time, temperature and pressure, the combination of an absorber, baffle structure in the lower portion thereof dividing it into first and second liquid compartments, means for introducing into the first of said compartments a stream of said petroleum, a plurality of baffles above said first compartment, the lighter gases and vapors in said stream passing upwardly in succession over said baffles, means for introducing an absorbing menstruum for countercurrent flow with said gases and vapors, means for directing enriched absorbing menstruum into said second of said compartments, a second absorber having a liquid compartment in its lower portion and a series of baffles extending upwardly therefrom, means for withdrawing gases and lighter vapors from said first-named compartment and for elevating them in pressure, means for withdrawing liquid from said first-named compartment and elevating it in pressure, means for uniting said gases and lighter vapors and said liquid, means for cooling the mixture, means for introducing said mixture of vapors and said liquid at their said elevated pressure into said liquid compartment of said second absorber, the gases and lighter vapors rising upwardly through said baffles therein, means for introducing absorbing menstruum into said second absorber for countercurrent contact with, and absorption and condensation of, vapors and gases suitable for inclusion in motor fuel, means for withdrawing liquid and enriched menstruum from said last-named compartment, means for stabilizing said liquid and enriched menstruum together with the enriched menstruum from said second compartment, to produce a liquid motor fuel, a fractionating tower, means for delivering thereto a part of said stabilized liquid fuel, means including said tower for separating the light ends from said fuel, and means for withdrawing from said tower a stream of said liquid fuel freed of said light ends and for delivering it to said absorbers as said absorbing menstruum.

THOMAS B. LEECH.